(12) United States Patent
Rostykus et al.

(10) Patent No.: US 11,693,708 B2
(45) Date of Patent: Jul. 4, 2023

(54) TECHNIQUES FOR INCREASING THE ISOLATION OF WORKLOADS WITHIN A MULTIPROCESSOR INSTANCE

(71) Applicant: NETFLIX, INC., Los Gatos, CA (US)

(72) Inventors: Benoit Rostykus, San Francisco, CA (US); Gabriel Hartmann, San Jose, CA (US)

(73) Assignee: NETFLIX, INC., Los Gatos, CA (US)

( * ) Notice: Subject to any disclaimer, the term of this patent is extended or adjusted under 35 U.S.C. 154(b) by 54 days.

(21) Appl. No.: 16/393,922

(22) Filed: Apr. 24, 2019

(65) Prior Publication Data
US 2020/0341811 A1   Oct. 29, 2020

(51) Int. Cl.
  *G06F 9/50* (2006.01)
  *G06F 12/084* (2016.01)
  *G06F 12/0842* (2016.01)
  *G06F 12/0811* (2016.01)

(52) U.S. Cl.
CPC .......... *G06F 9/505* (2013.01); *G06F 9/5016* (2013.01); *G06F 12/084* (2013.01); *G06F 12/0842* (2013.01); *G06F 12/0811* (2013.01); *G06F 2212/1016* (2013.01); *G06F 2212/1024* (2013.01); *G06F 2212/62* (2013.01)

(58) Field of Classification Search
None
See application file for complete search history.

(56) References Cited

U.S. PATENT DOCUMENTS

| 9,430,287 | B2 | 8/2016 | Zaroo | |
| 2003/0033486 | A1* | 2/2003 | Mizrachi | H04L 49/90 711/E12.07 |
| 2003/0159002 | A1* | 8/2003 | Betker | G06F 11/3419 711/136 |
| 2008/0092138 | A1* | 4/2008 | Chung | G06F 9/5033 718/100 |
| 2009/0328047 | A1 | 12/2009 | Li et al. | |

(Continued)

FOREIGN PATENT DOCUMENTS

CN   109471732 A   * 3/2019   .......... G06F 9/5027

OTHER PUBLICATIONS

"CPU Accounting Controller," The Linux Kernel Archives, kernel.org/doc/Documentation/cgroup-v1/cpuacct.txt, retrieved Apr. 15, 2020, 1 page.

(Continued)

*Primary Examiner* — Abu Zar Ghaffari
(74) *Attorney, Agent, or Firm* — Artegis Law Group, LLP

(57) ABSTRACT

In various embodiments, an isolation application determines processor assignment(s) based on a performance cost estimate. The performance cost estimate is associated with an estimated level of cache interference arising from executing a set of workloads on a set of processors. Subsequently, the isolation application configures at least one processor included in the set of processors to execute at least a portion of a first workload that is included in the set of workloads based on the processor assignment(s). Advantageously, because the isolation application generates the processor assignment(s) based on the performance cost estimate, the isolation application can reduce interference in a non-uniform memory access (NUMA) microprocessor instance.

20 Claims, 5 Drawing Sheets

(56) References Cited

U.S. PATENT DOCUMENTS

| | | | | |
|---|---|---|---|---|
| 2011/0055479 | A1* | 3/2011 | West | G06F 9/4881 |
| | | | | 711/118 |
| 2011/0055827 | A1* | 3/2011 | Lin | G06F 12/084 |
| | | | | 718/1 |
| 2011/0246995 | A1* | 10/2011 | Fedorova | G06F 9/5033 |
| | | | | 718/103 |
| 2012/0233393 | A1* | 9/2012 | Jiang | G06F 9/46 |
| | | | | 711/105 |
| 2013/0191843 | A1* | 7/2013 | Sarkar | G06F 9/505 |
| | | | | 718/105 |
| 2014/0201741 | A1* | 7/2014 | Govindan | G06F 9/5083 |
| | | | | 718/1 |
| 2014/0281235 | A1* | 9/2014 | Liu | G06F 11/3409 |
| | | | | 711/122 |
| 2015/0242217 | A1* | 8/2015 | Ding | G06F 9/3863 |
| | | | | 712/228 |
| 2015/0304232 | A1* | 10/2015 | Ashok | H04L 47/72 |
| | | | | 709/226 |
| 2016/0147655 | A1* | 5/2016 | Hower | G06F 12/0846 |
| | | | | 711/130 |
| 2016/0232036 | A1* | 8/2016 | Zhu | H04L 47/762 |
| 2017/0220389 | A1* | 8/2017 | Michael | H04L 67/10 |
| 2017/0329720 | A1* | 11/2017 | Bedi | G06F 12/123 |
| 2017/0357601 | A1* | 12/2017 | Arai | G06F 11/3409 |
| 2018/0069946 | A1* | 3/2018 | Katsev | G06F 12/126 |
| 2018/0203630 | A1* | 7/2018 | Waldspurger | H04L 43/08 |
| 2019/0018774 | A1* | 1/2019 | Birke | G06F 11/3409 |
| 2019/0215240 | A1* | 7/2019 | Li | G06Q 10/20 |

OTHER PUBLICATIONS

Lo et al, "Heracles: improving resource efficiency at scale", in Proceedings of the 42nd Annual International Symposium on Computer Architecture (ISCA '15), ACM, 2015, pp. 450-462. DOI:doi.org/10.1145/2749469.2749475. csl.stanford.edu/~christos/publications/2015.heracles.isca.pdf.

"Completely Fair Scheduling (CFS) Class," github.com/torvalds/linux/blob/master/kernel/sched/fair.c, retrieved Apr. 15, 2020, 236 pages.

"Welcome to CVXPY 1.0," CVXPY, cvxpy.org/, retrieved Apr. 15, 2020, 2 pages.

"SCHED_SETSCHEDULER(2)," man7.org/linux/man-pages/man2/sched_setscheduler.2.html, retrieved Apr. 15, 2020, 4 pages.

"NICE(2)," man7.org/linux/man-pages/man2/nice.2.html, retrieved Apr. 15, 2020, 3 pages.

Brendan Gregg, "The PMCs of EC2: Measuring IPC," brendangregg.com/blog/2017-05-04/the-pmcs-of-ec2.html, May 4, 2017, 8 pages.

International Search Report for application No. PCT/US2020/029695 dated Aug. 11, 2020.

Gracioli et al., "Implementation and evaluation of global and partitioned scheduling in a real-time OS", DOI 10.1007/sl 1241-013-9183-3, XP055719487, Real Time Systems, vol. 49, No. 6, May 2, 2013, pp. 669-714.

* cited by examiner $$C(\boxed{M}_{260}) = \alpha_{NU} \boxed{C_{NU}(M)}_{322} + \alpha_{LLC} \boxed{C_{LLC}(M)}_{332} + \alpha_{L1/2} \boxed{C_{L1/2}(M)}_{342} + \alpha_O \boxed{C_O(M)}_{352} + \alpha_P \boxed{C_P(M)}_{362}$$

$$\Rightarrow C(\boxed{M}_{260}, X, Y, Z, V) = \alpha_{NU} \boxed{C_{NU}(X)}_{322} + \alpha_{LLC} \boxed{C_{LLC}(Y)}_{332} + \alpha_{L1/2} \boxed{C_{L1/2}(Z)}_{342} + \alpha_O \boxed{C_O(M)}_{352} + \alpha_P \boxed{C_P(V)}_{362}$$

Cost Function 242

| Goal | Cost | Equations |
|---|---|---|
| NUMA Goal 320 *minimize cross-socket memory accesses* | NUMA Cost 322 | $C_{NU}(X) = -\sum_{j=1}^{k}\sum_{t=1}^{n} x_{t,j}$    $x_{t,j} \in \mathbb{N}^{n \times k}$    $x_{t,j} \leq \frac{1}{r_j} \sum_{i=(t-1)b+1}^{tb+1} m_{i,j}$    $x_{t,j} \leq 1$ |
| LLC Goal 330 *maximize number of sockets 120 used* | LLC Cost 332 | $C_{LLC}(Y) = -\sum_{t=1}^{k} y_t$    $y_t \in \mathbb{N}^n$    $y_t \leq \sum_{j=1}^{k} w_{t,j}$    $y_t \leq 1$ |
| L1/2 Goal 340 *maximize number of cores 130 used* | L1/2 Cost 342 | $C_{L1/2}(Z) = -\sum_{l=0}^{c-1} z_l$    $z_l \in \mathbb{N}^c$    $z_l \geq -1 + \sum_{j=1}^{k} m_{2l+1,j} + \sum_{j=1}^{k} m_{2l+2,j}$    $z_l \geq 0$ |
| Hyper-Thread Goal 350 *maximize hyperthread affinity* | Hyper-Thread Cost 352 | $C_O(M) = -\sum_{i=1}^{d}\sum_{j=1}^{k} u_{i,j} m_{i,j}$    $U \in \mathbb{N}^{d \times k}$    $u_{i,j} = i \times j \times \left\lceil \frac{i}{b} \right\rceil$ |
| Reshuffling Goal 360 *minimize reshuffling* | Reshuffling Cost 362 | $C_P(V) = -\sum_{i=1}^{d}\sum_{j=1}^{k} v_{i,j}$    $v_{i,j} \in \mathbb{Z}^{d \times k}$    $m_{i,j} - \tilde{m}_{i,j} \leq v_{i,j}$    $-m_{i,j} + \tilde{m}_{i,j} \leq v_{i,j}$ |

FIGURE 3

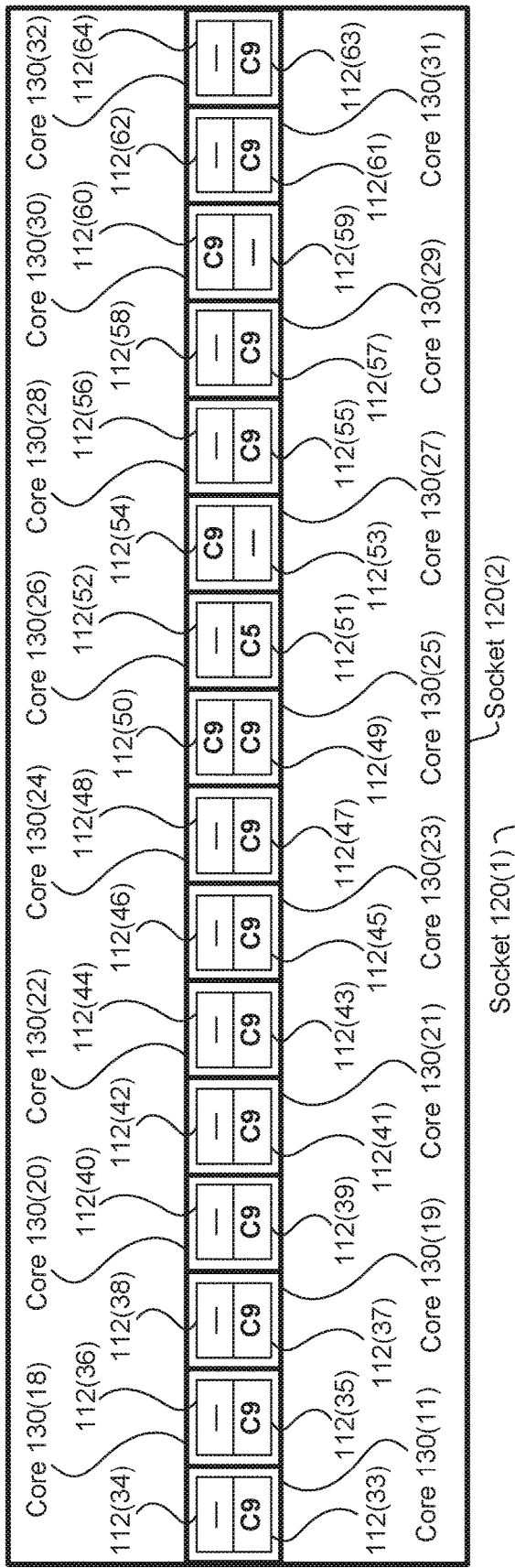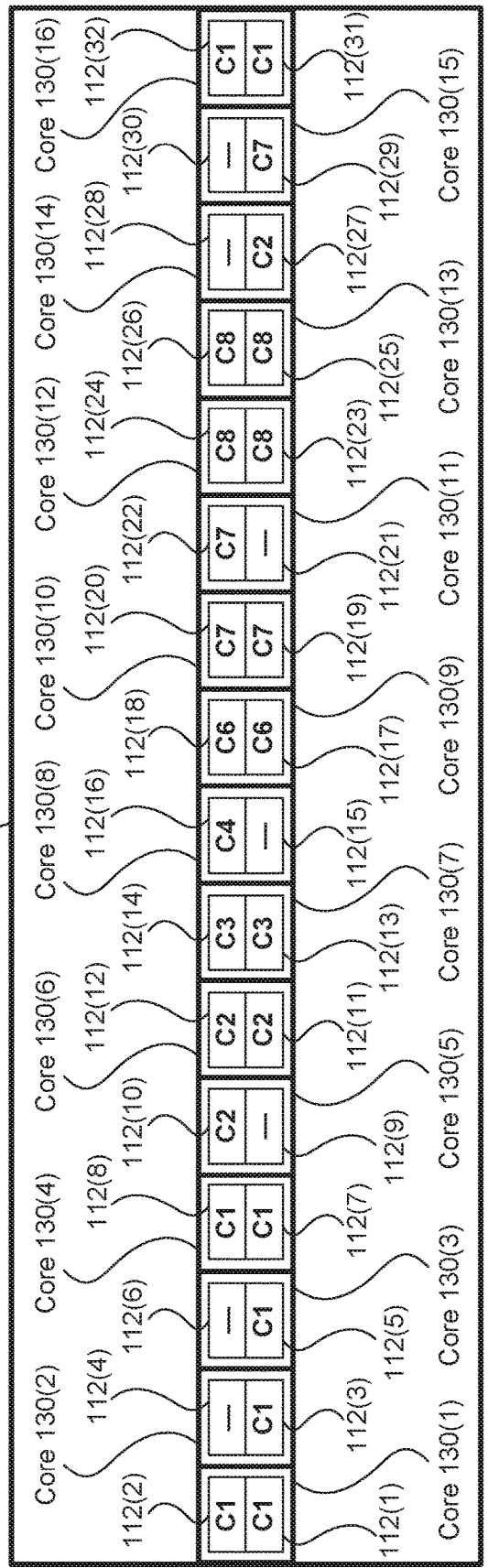
FIGURE 4

TECHNIQUES FOR INCREASING THE ISOLATION OF WORKLOADS WITHIN A MULTIPROCESSOR INSTANCE

BACKGROUND

Field of the Various Embodiments

Embodiments of the present invention relate generally to computer science and microprocessor technology and, more specifically, to techniques for increasing the isolation of workloads within a multiprocessor instance.

Description of the Related Art

In a typical multiprocessor instance, a process scheduler assigns one or more execution threads to logical processors for executing workloads based on a variety of criteria and heuristics. For example, the default process scheduler for the Linux kernel is the well-known Completely Fair Scheduler ("CFS"). The CFS implements a variation of a scheduling algorithm known as "weighted fair queuing," Where, at a simplified level, the CFS attempts to maintain a weighted fairness when providing processing time across different workloads. More precisely, when assigning execution threads to a logical processor, the CFS typically assigns the execution thread associated with the workload that is most "starved" for processing time according to various workload-specific weights.

One drawback of conventional process schedulers is that the performance impact of sharing caches (also referred to herein as "cache memories") in a hierarchical fashion among different groups of logical processors in a non-uniform memory access ("NUMA") multiprocessor instance is not properly considered when assigning execution threads to the relevant logical processors. For example, a NUMA multiprocessor instance could be divided into two physical blocks known as "sockets." Each socket could include sixteen cores, where each core could implement hyper-threading to provide two logical processors. Within each socket, the thirty-two logical processors could share a lowest-level cache ("LLC") and, within each core, the two logical processors could share a level 1 ("L1") cache and a level 2 ("L2") cache. In a phenomenon known as "noisy neighbor," when a group of logical processors shares the same cache, the manner in which each logical processor accesses the cache can negatively impact the performance of the other logical processors included in the same group of logical processors.

For example, if a thread (also referred to herein as an "execution thread") executing on one logical processor evicts useful data that another thread executing on a second logical processor has stored in a shared cache, then the throughput and/or latency of the second logical processor is typically degraded. Among other things, the evicted data needs to be re-cached for the thread executing on the second logical processor to perform efficient data accesses on that data. As a result of these types of cache interference scenarios, the time required to execute workloads on a NUMA microprocessor instance can be substantially increased. Further, because the time required to execute different workloads can vary based on the amount of cache interference as well as the type of cache interference, the execution predictability of workloads can be decreased, which can lead to preemptive over-provisioning of processors in cloud computing implementations. Over-provisioning can result in some processors or microprocessor instances not being used, which can waste processor resources and prevent adequate processor resources from being allocated to other tasks To reduce the negative impacts resulting from the "noisy neighbor" phenomenon, some process schedulers implement heuristics that (re)assign cache memory and/or execution threads in an attempt to avoid cache interference scenarios. For instance, the CFS can perform memory-page migrations and can reassign threads to different logical processors based on heuristics associated with the LLC. However, these types of heuristic-based mitigation strategies oftentimes do not reduce the performance and execution predictability issues associated with cache interference. For example, empirical results have shown that cache interference can increase the amount of time required to execute a workload on a NUMA microprocessor instance by a factor of three, even when heuristic-based migration strategies are being implemented.

As the foregoing illustrates, what is needed in the art are more effective techniques for executing workloads on logical processors.

SUMMARY

One embodiment of the present invention sets forth a computer-implemented method for executing workloads on logical processors. The method includes determining at least one processor assignment based on a performance cost estimate associated with an estimated level of cache interference arising from executing a set of workloads on a set of processors; and configuring at least one processor included in the set of processors to execute at least a portion of a first workload that is included in the set of workloads based on the at least one processor assignment.

At least one technical advantage of the disclosed techniques relative to the prior art is that, with the disclosed techniques, cache interference in a non-uniform memory access (NUMA) microprocessor instance can be automatically and reliably reduced. In particular, estimating cache interference via a linearized cost function enables an integer programming algorithm to compute an effective assignment of workloads to processors in a systematic, data-driven fashion. Because reducing cache interference improves the latency and/or throughput of the processors, the time required for workloads to execute can be substantially decreased. Further, the variances in both latency and throughput are decreased, thereby increasing execution predictability and decreasing preemptive over-provisioning. These technical advantages represent one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

FIG. 3 is a more detailed illustration of the cost function of FIG. 2, according to various embodiments of the present invention;

FIG. 4 illustrates an example of processor assignments for two of the sockets of FIG. 1, according to various embodiments of the present invention.

DETAILED DESCRIPTION

Figure 1:
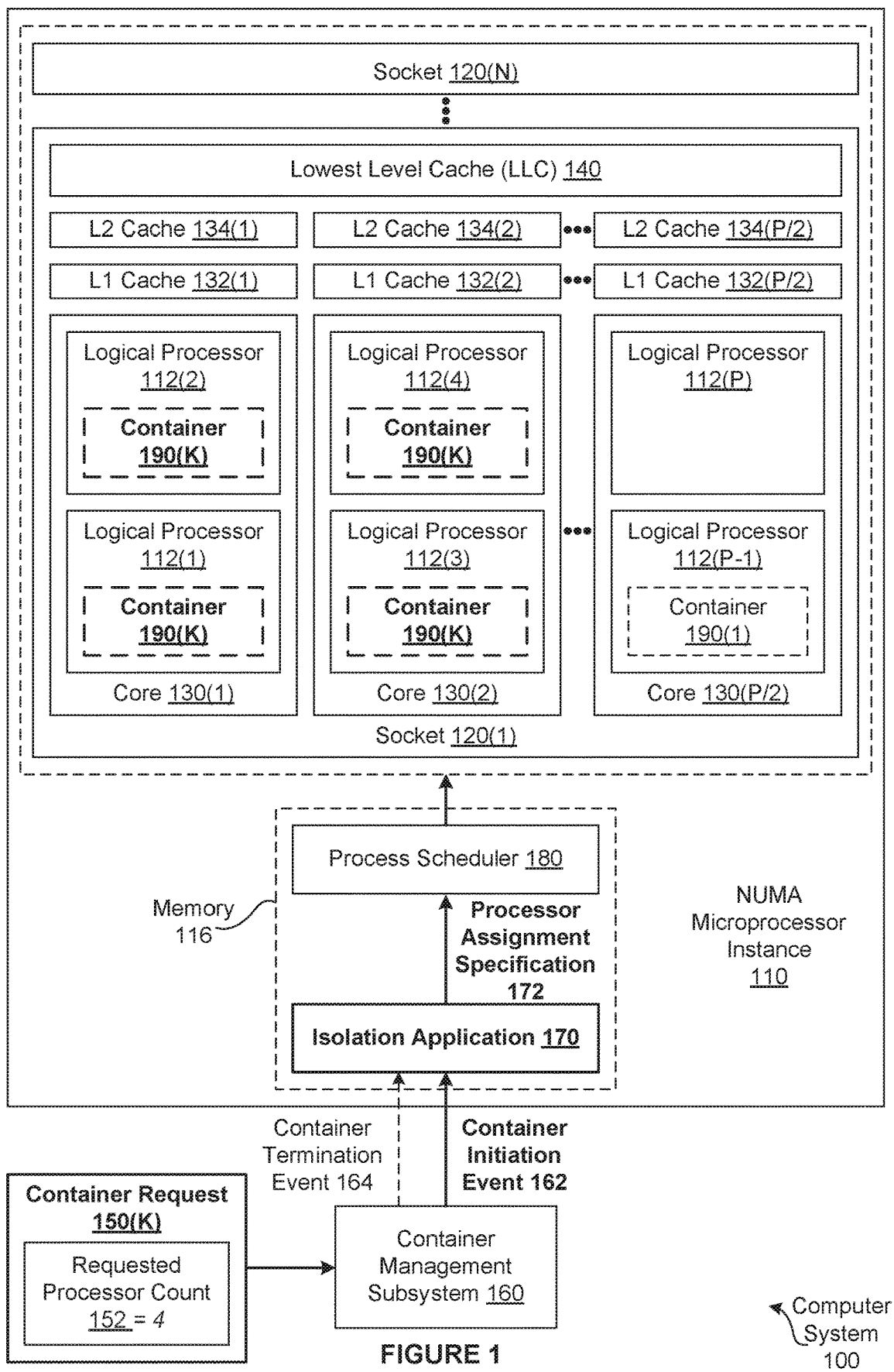
FIG. 1 is a conceptual illustration of a computer system configured to implement one or more aspects of the present invention.

In the following description, numerous specific details are set forth to provide a more thorough understanding of the various embodiments. However, it will be apparent to one of skilled in the art that the inventive concepts may be practiced without one or more of these specific details.

Oftentimes a service provider executes many diverse applications in a high-throughput fashion using microprocessor instances included in a cloud computing environment (i.e., encapsulated shared resources, software, data, etc.). To ensure the proper execution environment for each application, the applications are organized into groups that are associated with different stand-alone executable instances of code referred to as "containers." Each container provides the required dependencies and can execute any of the included applications. Notably, some containers may include batch applications while other containers may include applications that are intended to interface with users in real-time. When the service provider submits each container for execution, the service provider also specifies the number of logical processors on which to execute the container.

On each microprocessor instance, the containers are typically scheduled for execution by a process scheduler that assigns threads to logical processors included in the microprocessor instance based on a variety of scheduling criteria and heuristics. For example, the default process scheduler for the Linux kernel is the well-known Completely Fair Scheduler (CFS). At a simplified level, the CFS attempts to maintain a weighted fairness when providing processing time across different workloads (e.g., tasks, containers, etc.). For example, if four equally-weighted containers that each requested eight processors are executing on a microprocessor instance, then the CFS attempts to provide each container with 25% of the processing power of the microprocessor instance.

Since a typical service provider can run millions of containers in a cloud computing environment each month, effectively utilizing the resources allocated to the service provider within the cloud computing environment is critical. However, one drawback of typical process schedulers (including the CFS) is that the scheduling criteria and heuristics are not properly optimized for non-uniform memory access ("NUMA") multiprocessor instances that are often included in cloud computing environments. As a general matter, in a NUMA microprocessor instance, the memory access time varies based on the memory location relative to the logical processor accessing the memory location. In particular, data in use by the logical processors is typically stored in a hierarchy of shared caches, where different levels of the cache are associated with different ranges of access times. For example, some NUMA multiprocessor instances include thirty-two cores that can each execute two hyper-threads via two logical processors. The two logical processors included in each core share a level 1 (L1) cache and a level 2 (L2) cache, and the thirty-two cores share a lowest-level cache (LLC). Consequently, each logical processor shares an L1 cache and an L2 cache with another logical processor and shares an LLC with sixty-three other logical processors.

In a phenomenon known as "noisy neighbor," when a group of logical processors shares the same cache, the manner in which each logical processor accesses the cache can negatively impact the performance of the other logical processors included in the same group of logical processors. For example, if a thread executing on one logical processor evicts useful data that another thread executing on a second logical processor has stored in a shared cache, then the throughput and/or latency of the second logical processor is typically degraded. Among other things, the evicted data needs to be re-cached for the thread executing on the second logical processor to perform efficient data accesses on that data. As a result of these types of cache interference scenarios, the time required to execute workloads on a NUMA microprocessor instance can be substantially increased. For example, empirical results have shown that cache interference can increase the amount of time required to execute a workload on a NUMA microprocessor instance by a factor of three.

Further, because the time required to execute different workloads can vary based on the amount of cache interference as well as the type of cache interference, the execution predictability of workloads can be decreased, If an application is particularly time-sensitive, such as an application that interfaces with users in real-time, then the service provider may allocate more processors than necessary to ensure an acceptable response time based on the worst-case performance. Such "over-provisioning" can result in some processors or microprocessor instances not being used, which can waste processor resources and prevent adequate processor resources from being allocated to other tasks.

With the disclosed techniques, however, an isolation application executing on a NUMA microprocessor instance can over-ride the default scheduling behavior of the process scheduler to reduce cache interference. In one embodiment, whenever the set of containers executing on the NUMA microprocessor instance changes, the isolation application executes one or more integer programming algorithms to generate a set of processor assignments designed to reduce cache interference. More precisely, in a technique similar to optimizing the assignment of airplanes to routes, the integer programming algorithms perform optimization operations on a set of processor assignments to minimize a cost function that estimates the performance costs associated with cache interference. The isolation application then configures the process scheduler to assign each of the containers to the requested number of logical processors in the NUMA microprocessor instance based on the set of processor assignments.

At least one technical advantage of the disclosed techniques relative to the prior art is that the isolation application can automatically and reliably reduce cache interference associated with co-located threads (i.e., threads sharing at least one cache) in a NUMA microprocessor instance. Because reducing cache interference improves the latency and/or throughput of the processors, the time required for containers to execute can be substantially decreased. Further, the variances in both latency and throughput are decreased, thereby increasing execution predictability and decreasing preemptive over-provisioning. As a result, the overall amount of resources requested by containers can be reduced. These technical advantages represent one or more technological advancements over prior art approaches.

System Overview

FIG. 1 is a conceptual illustration of a computer system 100 configured to implement one or more aspects of the present invention. As shown, the computer system 100 includes, without limitation, a non-uniform memory access (NUMA) microprocessor instance 110, a container management subsystem 160, and a container request 150. In alternate embodiments, the computer system 100 may include any number and types of the NUMA microprocessor instance 110, the container management subsystem 160, and the container request 150 in any combination. For explanatory purposes, multiple instances of like objects are denoted with reference numbers identifying the object and parenthetical numbers identifying the instance where needed. In some embodiments, any number of the components of the computer system 100 may be distributed across multiple geographic locations or included in one or more cloud computing environments (i.e., encapsulated shared resources, software, data, etc.) in any combination.

The NUMA microprocessor instance 110 may be any type of physical system, virtual system, server, chip, etc. that includes multiple processors linked via a NUMA memory design architecture. As a general matter, in a NUMA architecture, the memory access time varies based on the memory location relative to the processor accessing the memory location. As shown, the NUMA microprocessor instance 110 includes, without limitation, any number of sockets 120, where each of the sockets 120 is a different physical block of processors and memory 116.

For explanatory purposes only, the memory 116 included in the NUMA microprocessor instance 110 is depicted as a dashed box irrespective of the actual location of the constituent blocks of physical memory (e.g., caches) within the NUMA microprocessor instance 110. At any given time, the software applications depicted within the memory 116 may be stored in any of the blocks of physical memory and may execute on any of the processors included in any of the sockets 120.

The memory 116 stores content, such as software applications and data, for use by the processors of the NUMA microprocessor instance 110. The memory 116 may be one or more of a readily available memory, such as random access memory ("RAM"), read only memory ("ROM"), floppy disk, hard disk, or any other form of digital storage, local or remote. In some embodiments, a storage (not shown) may supplement or replace the memory 116. The storage may include any number and type of external memories that are accessible to the processors included in the NUMA microprocessor instance 110. For example, and without limitation, the storage may include a Secure Digital Card, an external Flash memory, a portable compact disc read-only memory ("CD-ROM"), an optical storage device, a magnetic storage device, or any suitable combination of the foregoing.

Each of the sockets 120 includes, without limitation, a lowest-level cache (LLC) 140 and any number of cores 130, level one (L1) caches 132, and level two (L2) caches 134. Each of the cores 130 includes, without limitation, two logical processors 112. Each of the cores 130 may be any instruction execution system, apparatus, or device capable of executing instructions and having hyper-threading capabilities. For example, each of the cores 130 could comprise a different central processing unit ("CPU") having hyper-threading capabilities. Each of the logical processors 112 included in the core 130 is a virtual processing core that is capable of executing a different hyper-thread. For explanatory purposes, the term "thread" as used herein refers to any type of thread of execution, including a hyper-thread. In alternate embodiments, each of the cores 130 may include any number (including one) of the logical processors 112. In some embodiments, the cores 130 do not have hyper-threading capabilities and therefore each of the cores 130 is also a single logical processor 112.

The total number of the sockets 120 is N, where N is any positive integer. Within each of the sockets 120, the total number of each of the cores 130, the L1 caches 132, and the L2 caches 134 is P/2, where P is any positive integer, and the total number of the logical processors 112 is P. Consequently, within the NUMA microprocessor instance 110, the total number of the LLCs 140 is N; the total number of each of the cores 130, the L1 caches 132, and the L2 caches 134 is (N*P/2); and the total number of the logical processors 112 is (N*P).

Each of the caches is a different block of the memory 116, where the cache level (e.g., L1, L2, lowest-level) indicates the proximity to the associated cores 130. In operation, each of the caches is shared between multiple logical processors 112 in a hierarchical fashion. The LLC 140(g) is associated with the socket 120(g) and is shared between the P logical processors 112 included in the socket 120(g). The L1 cache 132(h) and the L2 cache 134(h) is associated with the core 130(h) and is shared between the two logical processors 112 included in the core 130(h). Consequently, each of the logical processors 112 shares one of the L1 caches 132 and one of the L2 caches 134 with another logical processor 112 and shares one of the LLCs 140 with (P−1) other logical processors 112.

In alternate embodiments, the NUMA microprocessor instance 110 may include any number and type of processors and any amount of the memory 116 structured in any technically feasible fashion that is consistent with a NUMA architecture. In particular, the number, type, and hierarchical organization of the different caches may vary. For instance, in some embodiments, multiple cores 130 share each of the L2 caches 134. In the same or other embodiments, the memory 116 includes four hierarchical levels of caches.

In general, the NUMA microprocessor instance 110 is configured to execute workloads associated with any number of software applications. Examples of workloads include, without limitation, threads, tasks, processes, containers 190, etc. To execute a workload, a process scheduler 180 assigns threads to one or more of the logical processors 112 for executing the workload based on a variety of scheduling criteria and heuristics. The process scheduler 180 may perform scheduling operations at any level of granularity thread, task, process, the container 190) in any technically feasible fashion.

One drawback of conventional process schedulers is that the performance impact of sharing caches (also referred to herein as "cache memories") in a hierarchical fashion among different groups of the logical processors 112 in the NUMA multiprocessor instance 110 is not properly considered when assigning threads to the relevant logical processors 112. In a phenomenon known as "noisy neighbor," when a group of the logical processors 112 shares the same cache, the manner in which each of the logical processor 112 accesses the cache can negatively impact the performance of the other logical processors 112 in the same group of logical processors 112.

For example, if a thread executing on the logical processor 112(1) evicts useful data that another thread executing on the logical processor 112(2) has stored in the L1 cache 132(1), then the throughput and/or latency of the logical processor 112(2) is typically degraded. Among other things, the evicted data needs to be re-cached for the thread executing on the logical processor 112(2) to perform efficient data accesses on that data. As a result of these types of cache interference scenarios, the time to execute workloads on a microprocessor system or instance that implements a NUMA architecture, such as the NUMA multiprocessor instance 110, can be substantially increased. Further, because the time required to execute different workloads can vary based on the amount of cache interference as well as the type of cache interference, the execution predictability of workloads can be decreased, which can lead to preemptive over-provisioning of processors in cloud computing implementations.

Optimizing Processor Assignments

To reliably reduce cache interference, the NUMA microprocessor instance 110 includes, without limitation, an isolation application 170. The isolation application 170 is a software application that, at any given time, may be stored in any portion of the memory 116 and may execute on any of the logical processors 112. In general, the isolation application 170 executes a data-driven optimization process to determine an optimized set of processor assignments. When implemented by the process scheduler 180, the optimized set of processor assignments reduces cache interfere within the NUMA microprocessor instance 110, thereby increasing the isolation between the processors 112 when executing threads.

As referred to herein, a "processor assignment" is an assignment of a workload at any granularity for execution by one or more of the logical processors 112. As referred to herein, a "workload" is a set of executable instructions that represents a discrete portion of work. Examples of workloads include, without limitation, a thread, a task, a process, and the container 190. With respect to processor assignment, the term "assignment" is symmetrical. Consequently, a processor assignment between the container 190($x$) and the logical processor 112($y$) can be referred to as either "assigning the container 190($x$) to the logical processor 112($y$)" or "assigning the logical processor 112($y$) to the container 190($x$)."

Note that the techniques described herein are illustrative rather than restrictive, and may be altered without departing from the broader spirit and scope of the invention. Many modifications and variations will be apparent to those of ordinary skill in the art without departing from the scope and spirit of the described embodiments and techniques Further, in various embodiments, any number of the techniques disclosed herein may be implemented while other techniques may be omitted in any technically feasible fashion.

In particular and for explanatory purposes, the functionality of the isolation application 170 is described herein in the context of the containers 190. Each of the containers 190 is associated with a stand-alone executable instance of code that provides an independent package of software including, without limitation, any number of applications and the associated dependencies. Accordingly, each of the containers 190 may execute any number (including one) of tasks via any number (including one) of threads.

However, as persons skilled in the art will recognize, the techniques described herein are applicable to optimizing processor assignments at any level of granularity. In alternate embodiments, the isolation application 170 may assign any type of workload to any type of processors and the techniques described herein may be modified accordingly. For instance, in some embodiments, the isolation application 170 assigns different threads to different cores 130.

As shown, the isolation application 170 generates a processor assignment specification 172 in response the receiving a container initiation event 162 or a container termination event 164. The container initiation event 162 is associated with a container request 150 to execute a new container 190 within the NUMA microprocessor instance 110. The container request 150 includes, without limitation, a requested processor count 152. The requested processor count 152 specifies the number of logical processors 112 that are solicited for execution of the requested container 190. By contrast, the container termination event 164 is associated with the termination of the container 190 that was previously executing within the NUMA microprocessor instance 110.

The isolation application 170 may acquire the container initiation events 162 and the container termination events 164 in any technically feasible fashion. In the embodiment depicted in FIG. 1, the container management subsystem 160 transmits the container initiation events 162 and the container termination events 164 to the isolation application 170. In general, the container management subsystem 160 receives any number of container requests 150 and performs any number and type of activities related to generating and executing the containers 190 on any number and type of microprocessor systems, including the NUMA microprocessor instance 110.

Figure 2:
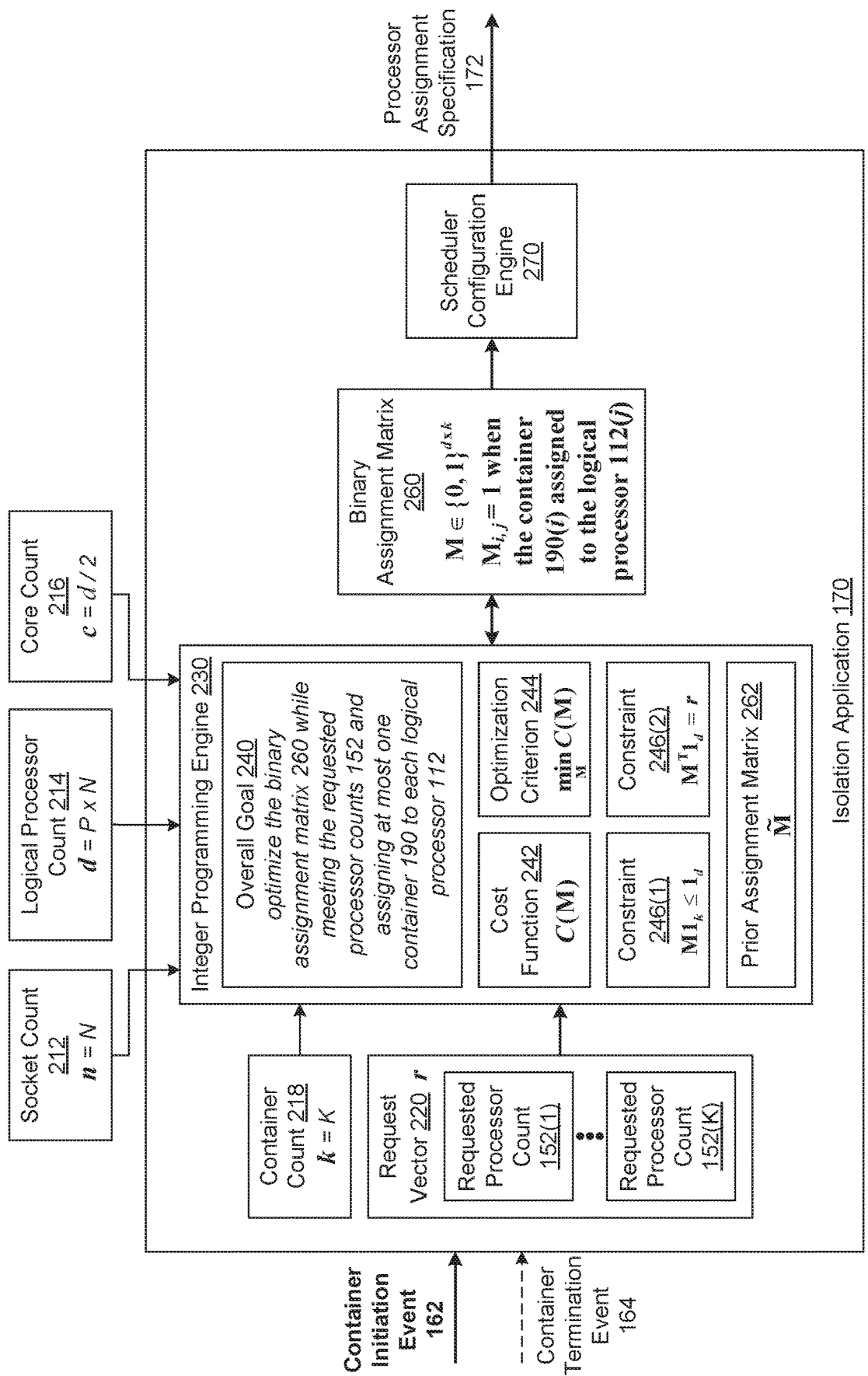
FIG. 2 is a more detailed illustration of the isolation application of FIG. 1, according to various embodiments of the present invention.

As described in greater detail in conjunction with FIGS. 2 and 3, the isolation application 170 executes one or more integer programming algorithms to optimize a binary assignment matrix based on a cost function that estimates a performance cost associated with cache interference. For each of the containers 190 currently executing or initiating execution on the NUMA microprocessor instance 110, the binary assignment matrix specifies at least one processor assignment. The isolation application 170 generates the processor assignment specification 172 based on the binary assignment matrix and then transmits the processor assignment specification 172 to the process scheduler 180. The processor assignment specification 172 configures the process scheduler 180 to assign the containers 190 to the logical processors 112 as per the binary assignment matrix. The processor assignment specification 172 may configure the process scheduler 180 in any technically feasible fashion.

It will be appreciated that the computer system 100 shown herein is illustrative and that variations and modifications are possible. For example, the functionality provided by the isolation application 170 and the process scheduler 180 as described herein may be integrated into or distributed across any number of software applications (including one), and any number of components of the computer system 100. For instances, in some embodiments, the isolation application 170 may reside and/or execute externally to the NUMA microprocessor instance 110. In various embodiments, the process scheduler 180 may be omitted from the NUMA microprocessor instance 110, and the isolation application 170 may include the functionality of the process scheduler 180. Further, the connection topology between the various units in FIG. 1 may be modified as desired.

FIG. 2 is a more detailed illustration of the isolation application 170 of FIG. 1, according to various embodiments of the present invention. In operation, the isolation application 170 generates a new processor assignment specification 172 whenever the isolation application 170 receives a new container initiation event 162 or a new container termination event 164. To properly generate the processor assignment specification 172 for the NUMA microprocessor instance 110 on which the isolation application 170 is executing, the isolation application 170 acquires a socket count 212, a logical processor count 214, and a core count 216. The isolation application 170 may acquire the socket count 212, the logical processor count 214, and the core count 216 in addition to any other relevant information associated with the NUMA microprocessor instance 110 in any technically feasible fashion. For instance, in some embodiments, the isolation application 170 may obtain information associated with the NUMA microprocessor instance 110 via an application programming interface ("API").

The socket count 212 specifies the number of the sockets 120 included in the NUMA microprocessor instance 110. The logical processor count 214 specifies the number of the logical processors 112 included in the NUMA microprocessor instance 110. The core count 216 specifies the number of the cores 130 included in the NUMA microprocessor instance 110. With reference to FIG. 1, the socket count 212 is N, the logical processor count 214 is the product of N and P, and the core count 216 is half of the logical processor count 214. As depicted in FIG. 2, the socket count 212 is symbolized as a constant "n", the logical processor count 214 is symbolized as a constant "d", and the core count 216 is symbolized as a constant "c".

As shown, the isolation application 170 includes, without limitation, a container count 218, a request vector 220, an integer programming engine 230, a binary assignment matrix 260, and a scheduler configuration engine 270. The container count 218 is equal to the total number of the containers 190 to be assigned to the NUMA microprocessor instance 110 via the binary assignment matrix 260. With reference to FIG. 1, the container count 218 is K (assuming that none of the containers 190(1)-190(K-1) have terminated). As depicted in FIG. 2, the container count 218 is symbolized as a variable "k".

For each of the containers 190 that are to be assigned to the NUMA microprocessor instance 110, the request vector 220 specifies the requested processor count 152 of the associated container request 150. The request vector 220 is symbolized as "r". The request vector 220 is assumed to have at least one feasible solution, expressed as the following equation (1):

$$\Sigma_i r_i \leq d \quad r \in N^k \qquad (1)$$

Prior to receiving the first container initiation event 162, the isolation application 170 sets the container count 218 equal to zero and sets the request vector 220 equal to NULL. Upon receiving the container initiation event 162, the isolation application 170 increments the container count 218 and adds the requested processor count 152 of the associated container request 150 to the request vector 220. For explanatory purposes, the requested processor count 152 associated with the container 190(x) is the $x^{th}$ element "$r_x$" of the request vector 220. In a complementary fashion, upon receiving the container termination event 164, the isolation application 170 decrements the container count 218 and removes the associated requested processor count 152 from the request vector 220.

As shown, the integer programming engine 230 generates the binary assignment matrix 260 based on the request vector 220, the socket count 212, the logical processor count 214, the core count 216, and the container count 218. The binary assignment matrix 260 is symbolized as "M" and specifies the assignments of the containers 190 to the logical processors 112. The dimensions of the binary assignment matrix 260 is d (the logical processor count 214) rows by k (the container count 218) columns, and each element included in the binary assignment matrix 260 is either zero or one. Consequently, $M \in \{0,1\}^{d \times k}$.

The $i^{th}$ row of the binary assignment matrix 260 represents the logical processor 112(i) and the $j^{th}$ column of the binary assignment matrix 260 represents the container 190(j). If the container 190(j) is assigned to the logical processor 112(i), then the element included in the binary assignment matrix 260 is 1. Otherwise, the element $M_{i,j}$ included in the binary assignment matrix 260 is 0. Note that, as previously described herein, the term "assignment" is symmetrical. If $M_{i,j}$ is equal to one, then the container 190(j) is assigned to the logical processor 112(i), and the logical processor 112(i) is assigned to the container 190(j). Importantly, each of the logical processors 112 is assigned to at most one of the containers 190, while each of the containers 190 can be assigned to multiple logical processors 112 that each execute a different thread.

Before generating a new binary assignment matrix 260, the integer programming engine 230 stores the current processor assignments in a prior assignment matrix 262 that is symbolized as $\tilde{M}$. Prior to receiving the first container initiation event 162, the integer programming engine 230 sets the binary assignment matrix 260 equal to NULL, corresponding to the container count 218 of 0. Subsequently, upon receiving the container initiation event 162, the integer programming engine 230 copies the binary assignment matrix 260 to the prior assignment matrix 262. The integer programming engine 230 then adds a new column of zeros corresponding to the new container 190 to the prior assignment matrix 262.

In a complementary fashion, upon receiving the container termination event 164, the integer programming engine 230 copies the binary assignment matrix 260 to the prior assignment matrix 262. The integer programming engine 230 then removes the column corresponding to the container 190 associated with the container termination event 164 from the prior assignment matrix 262.

The integer programming engine 230 implements an overall goal 240 via a cost function 242, an optimization criterion 244, constraints 246(1) and 246(2), and the prior assignment matrix 262. The overall goal 240 is to optimize the binary assignment matrix 260 with respect to the cost function 242 while meeting the requested processor counts 152 and assigning at most one of the containers 190 to each of the logical processors 112.

The cost function 242 is symbolized as "C(M)" and estimates a cost associated with cache interference for the binary assignment matrix 260. The cost function 242 is described in greater detail in conjunction with FIG. 3. The optimization criterion 244 specifies that the integer programming engine 230 is to search for the binary assignment matrix 260 that minimizes the cost function 242 under a set of constraints that includes, without limitation, the constraints 246. The optimization criterion 244 can be expressed as the following equation (2):

$$\min_{M} C(M) \qquad (2)$$

The constraint 246(1) specifies that, for each of the containers 190, a valid binary assignment matrix 260 provides the requested processor count 152 specified in the associated container request 150. The constraint 246(1) can be expressed as the following equation (3a):

$$M^T 1_d = r \qquad (3a)$$

As referred to herein, $1_l \in R^l$ is the constant vector of one values of dimension l.

The constraint 246(2) specifies that at most one container 190 can be assigned to each of the logical processors 112. The constraint 246(2) can be expressed as the following equation (3b):

$$M 1_k \le 1_d \qquad (3b)$$

In operation, to achieve the overall goal 240, the integer programming engine 230 implements any number and type of integer programming operations based on the cost function 242, the optimization criterion 244, the constraints 246(1) and 246(2), and the prior assignment matrix 262. For instance, in some embodiments, the integer programming engine 230 implements versions of the cost function 242, the optimization criterion 244, and the constraints 246 that are amenable to solution using integer linear programming. The integer programming engine 230 executes a solver that implements any number and combination of integer linear programming techniques to efficiently optimize the binary assignment matrix 260. Examples of typical integer linear programming techniques include, without limitation, branch and bound, heuristics, cutting planes, linear programming ("LP") relaxation, etc.

The scheduler configuration engine 270 generates the processor assignment specification 172 based on the binary assignment matrix 260 and transmits the processor assignment specification 172 to the process scheduler 180. In general, the processor assignment specification 172 configures the process scheduler 180 to assign the containers 190 to the logical processors 112 as per the assignments specified in the binary assignment matrix 260. The scheduler configuration engine 270 may generate any type of processor assignment specification 172, at any level of granularity, and in any technically feasible fashion that is consistent with the process scheduler 180 executing on the NUMA microprocessor instance 110.

For instance, in some embodiments, the processor assignment specification 172 includes any number of processor affinity commands that bind a process (e.g., the container 190) or a thread to a specific processor (e.g., the logical processor 112) or a range of processors. In Linux, for example, the affinity of a process can be altered using a "taskset" program and the "sched_setaffinity" system call, while the affinity of a thread can be altered using the library function "pthread_setaffinity_np" and the library function "pthread_attr_setaffinity_np".

The isolation application 170 generates a new processor assignment specification 172 whenever the isolation application 170 receives a new container initiation event 162 or a new container termination event 164. Consequently, the isolation application 170 re-optimizes the binary assignment matrix 260 whenever the set of containers 190 executing on the NUMA microprocessor instance 110 changes. However, as described in greater detail in conjunction with FIG. 3, one of the terms in the cost function 242 penalizes migrating containers 190 from one logical processor 112 to another logical processor 112, thereby discouraging the isolation application 170 from modifying processor assignments for currently executing containers 190.

Note that the techniques described herein are illustrative rather than restrictive, and may be altered without departing from the broader spirit and scope of the invention. Many modifications and variations will be apparent to those of ordinary skill in the art without departing from the scope and spirit of the described embodiments and techniques. As a general matter, the techniques outlined herein are applicable to assigning any type of workload to any type of processor based on a function associated with accessing shared caches in a NUMA architecture.

Estimating Costs of Cache Interference

FIG. 3 is a more detailed illustration of the cost function 242 of FIG. 2, according to various embodiments of the present invention. As described previously herein with conjunction with FIG. 2, the cost function 242 estimates the performance impact of cache interference, and the integer programming engine 240 performs optimization operations that minimize the cost function 242. More precisely, the cost function 242 estimates a value for a cost that is correlated with the performance impact of cache interference. As shown, the cost function 242 is a weighted sum of five different constituent costs: a NUMA cost 322, an LLC cost 332, an L1/2 cost 342, a hyper-thread cost 352, and a reshuffling cost 362. The cost function 242 can be expressed as the following equation (4):

$$C(M) = \alpha_{NU} C_{NU}(M) + \alpha_{LLC} C_{LLC}(M) + \alpha_{L1/2} C_{L1/2}(M) + \alpha_O C_O(M) + \alpha_P C_P(M) \qquad (4)$$

The weights $\alpha_{NU}$, $\alpha_{LLC}$, $\alpha_{L1/2}$, $\alpha_O$, and $\alpha_P$ are hyperparameters that encode the relative contribution of each of the constituent costs to the overall performance impact associated with cache interference. Consequently, the weights reflect the relative importance of different goals associated with the constituent costs. In an order of highest importance to lowest importance, the constituent goals are a NUMA goal 320, an LLC goal 330, an L1/2 goal 340, a hyper-thread goal 350, and a reshuffling goal 360. Notably, the weights are associated with the latency costs of the various levels of the cache hierarchy, cross-socket NUMA accesses, and migration costs associated with reassigning threads. In some embodiments, the weights may be varied to reflect the characteristics of different NUMA microprocessor instances 110.

To render equation (4) amenable to solution via integer programming techniques, each of the constituent costs may be linearized as described below, resulting in a linearized form of the cost function 242 that can be expressed as the following equation (5):

$$C(M,X,Y,Z,V) = \alpha_{NU} C_{NU}(X) + \alpha_{LLC} C_{LLC}(Y) + \alpha_{L1/2} C_{L1/2}(Z) + \alpha_O C_O(M) + \alpha_P C_P(V) \qquad (5)$$

To facilitate the description of the constituent costs, a symbol "b" specifies the number of the logical processors 112 included in each of the sockets 120, is equal to the logical processor count 214 (d) divided by the socket count 212 (n), and is assumed to be constant across the sockets 120. Further, as depicted in FIG. 1, where b=P, indexing of the logical processor 112 corresponds to the parenthetical numbering and the following convention:

The logical processor 112(1) is the first logical processor 112 included in the core 130(1) of the socket 120(1)

The logical processor 112(2) is the second logical processor 112 included in the core 130(1) of the socket 120(1)

The logical processor 112(3) is the first logical processor 112 included in the core 130(2) of the socket 120(1)

. . .

The logical processor 112(*b*) is the second logical processor 112 included in the last core 130(*c*) of the socket 120(1)

The logical processor 112(*b*+1) is the first logical processor 112 included in the first core 130(*c*+1) of the socket 120(2)

...

The NUMA goal 320 and the NUMA cost 322 are defined based on a hypothesis that assigning a workload to a set of the logical processors 112 included in a single socket 120 instead of assigning the workload to a set of the logical processors 112 spread across multiple sockets 120 typically reduces cross-socket memory accesses. Accordingly, the NUMA goal 320 is to minimize cross-socket memory accesses. In a complementary fashion, the NUMA cost 322 reflects the cross-socket memory access cost of executing the container 190 on a set of the logical processors 112 that spans multiple sockets 120. Quantitatively, the NUMA cost 322 can be expressed as the following equations (6a) and (6b):

$$C_{NU}(M) = -\sum_{j=1}^{k}\sum_{t=1}^{n} -\min(r_j, w_{t,j}) \tag{6a}$$

$$w_{t,j} = \sum_{i=(t-1)b+1}^{tb+1} m_{i,j} \quad w_{t,j} \in N^{n \times k} \tag{6b}$$

As referred to herein, $w_{t,j}$ is the number of the logical processors 112 included in the socket 120(*t*) that are assigned to the container 190(*j*). As persons skilled in the art will recognize, if any of the logical processors 122 assigned to the container 190(*j*) are not included in the socket 120(*t*), then min($r_j$−min($r_j$, $w_{t,j}$) 1) is equal to 1. Otherwise, min($r_j$−min($r_j$, $w_{t,j}$), 1) is equal to 0. In this fashion, the NUMA cost 322 is related to the number of the containers 190 that span multiple sockets 120(*t*), and minimizing the NUMA cost 322 achieves the NUMA goal 320.

Linearizing the min function to re-parameterize equation (6a) results in the following equations (7a) and (7b) (introducing extra integer variables $x_{t,j}$) for the NUMA cost 322:

$$C_{NU}(X) = \sum_{j=1}^{k}\sum_{t=1}^{n} x_{t,j} \tag{7a}$$

$$x_{t,j} \leq \frac{1}{r_j} \sum_{i=(t-1)b+1}^{tb+1} m_{i,j} \quad x_{t,j} \leq 1 \quad x_{t,j} \in N^{n \times k} \tag{7b}$$

The LLC goal 330 and the LLC cost 332 are defined based on a hypothesis that spreading workloads across the sockets 120 typically avoids/reduces LCC trashing. As referred to herein, LCC trashing is the eviction of useful data from the LCCs 140. Accordingly, the LLC goal 330 is to maximize the number of the sockets 120 executing workloads. In a complementary fashion, the LLC cost 332 reflects the cost of leaving one or more of the sockets 120 empty (i.e., assigning none of the logical processors 112 included in the socket 120 to any of the containers 190). Quantitatively, the LLC cost 332 can be expressed as the following equations (8a) and (8b):

$$C_{LLC}(M) = \sum_{t=1}^{k}\left[1 - \min\left(1, \sum_{j=1}^{k} w_{t,j}\right)\right] \tag{8a}$$

$$w_{t,j} = \sum_{i=(t-1)b+1}^{tb+1} m_{i,j} \quad w_{t,j} \in N^{n \times k} \tag{8b}$$

Linearizing equation (8a) results in the following equations (9a) and (9b) (introducing extra integer variables $y_t$) for the LLC cost 332:

$$C_{LLC}(Y) = -\sum_{t=1}^{k} y_t \tag{9a}$$

$$y_t \leq \sum_{j=1}^{k} w_{t,j} \quad y_t \leq 1 \quad y_t \in N^n \tag{9b}$$

The L1/2 goal 340 and the L1/2 cost 342 are defined based on a hypothesis that assigning workloads to more of the cores 130 typically avoids/reduces L1/2 trashing. As referred to herein, L1/2 trashing is the eviction of useful data from the L1 caches 132 and/or the L2 caches 134. Accordingly, the L1/2 goal 340 is to maximize the number of the cores 130 that are used. The core 130 is considered to be used when at least one of the containers 190 are assigned to at least one of the logical processors 112 included in the core 130.

The number of the containers 190 that are assigned to the core 130(*l*) is equal to the sum of the two rows of the binary assignment matrix (M) 260 associated with the core 130(*l*). As described in greater detail previously herein in conjunction with FIG. 2, the two rows of the binary assignment matrix (M) 260 associated with the core 130(*l*) are the row (2*l*) associated with the logical processor 112(2*l*) and the row (2*l*+1) associated with the logical processor (2*l*+1). As a general matter, the number of the containers 190 that are assigned to the core 130(*l*) is either zero, one, or two, and can be computed using the following summation (10):

$$\sum_{j=1}^{k} m_{2l,j} + \sum_{j=1}^{k} m_{2l+1,j} \tag{10}$$

If the number of the containers 190 that are assigned to the core 130(*l*) is two, then two threads are executing on the core 130(*l*), sharing both the L1 cache 132(*l*) and the L2 cache 134(*l*). Accordingly, minimizing the number of the cores 130 for which the summation (10) is equal to two achieves the L1/2 goal 340, and the L1/2 cost 342 can be expressed as the following equation (11):

$$C_{L1/2}(M) = \sum_{l=1}^{c} \max\left(0, -1 + \sum_{j=1}^{k} m_{2l,j} + \sum_{j=1}^{k} m_{2l+1,j}\right) \tag{11}$$

Linearizing the max function to re-parameterize equation (11) results in the following equations (12a) and (12b) (introducing extra integer variables $z_l$) for the L1/2 cost 342:

$$C_{L1/2}(Z) = -\sum_{l=0}^{c-1} z_l \tag{12a}$$

$$z_l \geq -1 + \sum_{j=1}^{k} m_{2l+1,j} + \sum_{j=1}^{k} m_{2l+2,j} \quad z_l \geq 0 \quad z_l \in N^c \quad (12b)$$

The hyper-thread goal 350 and the hyper-thread cost 352 are defined based on a hypothesis that when two hyper-threads of the same core 130 are required to co-exist, associating the hyper-threads with the same workload typically reduces cache interference. More precisely, to reduce cache interference, assigning the same container 190 to the two logical processors 112 included in the core 130(x) is preferable to assigning different containers 190 to the two logical processors 112 included in the core 130(x). Accordingly, the hyper-thread goal 350 is to maximize hyper-thread affinity.

To encode the hyper-thread goal 350 in a manner that is amenable to solution via integer programming techniques, the elements of a matrix U are defined based on the following equation (13):

$$u_{i,j} = i \times j \times \left\lceil \frac{i}{b} \right\rceil \quad \lceil x \rceil = \text{ceil}(x) \quad U \in N^{d \times k} \quad (13)$$

Penalizing scheduling in which assigned logical processors 112 are not contiguous and preferring scheduling of the logical processors 112 and the sockets 120 having low indices results in the following equation (14) for the hyper-thread cost 352:

$$C_O(M) = -\sum_{i=1}^{d} \sum_{j=1}^{k} u_{i,j} m_{i,j} \quad (14)$$

Notably, equation (14) is linear in M. As persons skilled in the art will recognize, when both of the logical processors 112 in a given core 130(x) are used, the combination of the hyper-thread cost 352 and the L1/2 cost 342 predisposes the integer programming engine 230 to assign the same container 190 to both of the logical processors 112. Further, the hyper-thread cost 352 predisposes the integer programming engine 230 to generate visually "organized" processor assignments, in which assigned indices are often contiguous.

The reshuffling goal 360 and the reshuffling cost 362 are defined based on a hypothesis that when a new workload is initiated or an existing task workload, retaining the processor assignments of currently executing workloads is preferable to reassigning the workloads. Accordingly, the reshuffling goal 360 is to minimize the reshuffling of the containers 190 between the logical processors 112, and the reshuffling cost 362 penalizes processor assignments that deviate from the current binary assignment matrix 260. The reshuffling cost 362 can be expressed as the following equation (15):

$$C_P(V) = -\sum_{i=1}^{d} \sum_{j=1}^{k} |m_{i,j} - \tilde{m}_{i,j}| \quad (15)$$

As described previously in conjunction with FIG. 2, M symbolizes the prior assignment matrix 262. The prior assignment matrix 262 is the previous binary assignment matrix 260 augmented with a final column for a new container 190 or modified with a column filled with zeros for a terminated container 190.

Linearizing the equation (15) results in the following equations (16a) and (16b) (introducing extra integer variables $v_{i,j}$) for the reshuffling cost 362:

$$C_P(V) = -\sum_{i=1}^{d} \sum_{j=1}^{k} v_{i,j} \quad (16a)$$

$$m_{i,j} - \tilde{m}_{i,j} \leq v_{i,j} \quad -m_{i,j} + \tilde{m}_{i,j} \leq v_{i,j} \quad v_{i,j} \in \mathbb{Z}^{d \times k} \quad (16b)$$

FIG. 4 illustrates an example of processor assignments for two of the sockets 120(1) and 120(2) of FIG. 1, according to various embodiments of the present invention. As described previously herein, each of the logical processor(s) 112 that are assigned to the container 190(x) executes a different thread associated with the container 190(x). For explanatory purposes only, each of the logical processors 112 is annotated with either a number (in bold) specifying the index of the assigned container 190(x) or a dash specifying that the logical processor 112 is not assigned to any of the containers 190. Notably, the processor assignments manifest the goals that are associated with minimizing the cost function 242.

As shown, the containers 190(1), 190(2), 190(3), 190(4), 190(6), 190(7), and 190(8) are assigned, respectively, to eight, four, two, one, two, four, and four of the logical processors 112 included in the socket 120(1) and none of the logical processors 112 included in the socket 120(2). By contrast, the containers 190(5) and 190(9) are assigned, respectively, to sixteen and one of the logical processors 112 included in the socket 120(2) and none of the logical processors 112 included in the socket 120(1). Accordingly, both the NUMA goal 320 of minimizing cross-socket memory accesses and the LLC goal 330 of maximizing the number of the sockets 120 that are used are achieved.

Each of the cores 130 is associated with exactly one of the containers 112. More precisely, either one or both of the logical processors 112 in the core 130(x) is/are assigned to a single container 112. Accordingly, both the L1/2 goal 340 of maximizing the number of cores 130 used and the hyper-thread goal 350 of maximizing hyper-thread affinity are achieved. Because the previous processor assignments are not depicted in FIG. 4, FIG. 4 does not illustrate the achievement of the reshuffling goal 360.

Figure 5:
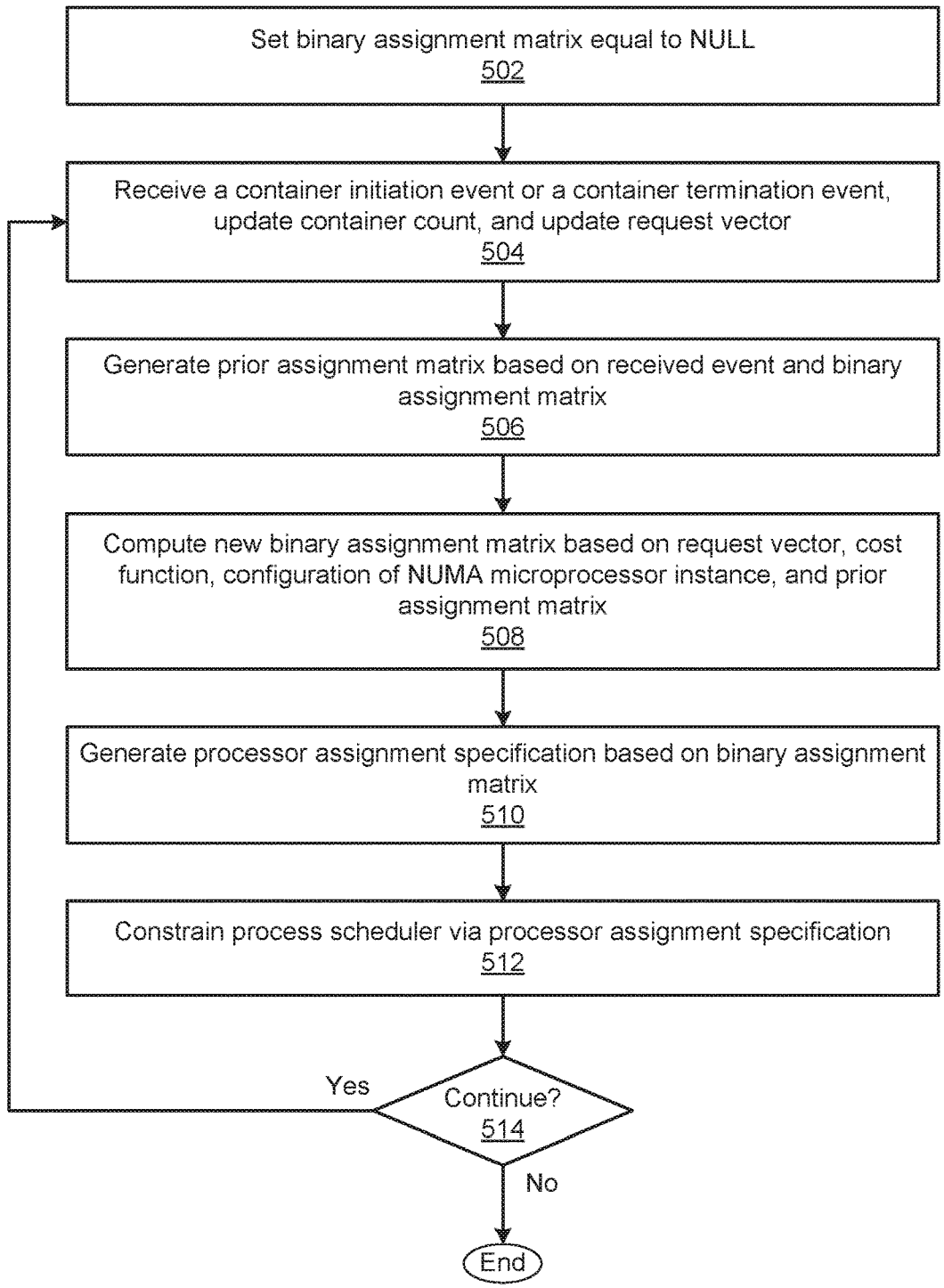
FIG. 5 is a flow diagram of method steps for executing workloads on processors that share at least one cache, according to various embodiments of the present invention.

FIG. 5 is a flow diagram of method steps for executing workloads on processors that share at least one cache, according to various embodiments of the present invention. Although the method steps are described with reference to the systems of FIGS. 1-4, persons skilled in the art will understand that any system configured to implement the method steps, in any order, falls within the scope of the present invention. In particular, although the method steps are described in the context of the containers 190, the containers 190 may be replaced with any type of workload in alternate embodiments.

As shown, a method 500 begins at step 502, where the isolation application 170 sets the binary assignment matrix 260 equal to NULL to indicate that no containers 190 are currently executing on the NUMA microprocessor instance 110. At step 504, the isolation application 170 receives a new container initiation event 162 (including the requested processor counter 152) or a new container termination event 164 from the container management subsystem 160, updates the container count 218, and updates the request vector 220. As described previously in conjunction with FIG. 2, the request vector 220 contains the requested processor counts 152 for each of the containers 190 executing or initiating execution on the NUMA microprocessor instance 110.

At step 506, the integer programming engine 230 generates the prior assignment matric 262 based on the binary assignment matrix 260 and the newly received event (either the container initiation event 162 or the container termination event 164). At step 508, the integer programming engine 230 computes a new binary assignment matrix 260 based on the request vector 220, the cost function 242, the configuration of the NUMA microprocessor instance 110, and the prior assignment matrix 262.

At step 510, the scheduler configuration engine 270 generates the processor assignment specification 172 based on the binary assignment matrix 260. At step 512, the scheduler configuration engine 270 constrains the process scheduler 180 via the processor assignment specification 172. As a result, the default scheduling behavior of the process scheduler 180 is over-ruled, and the process scheduler 180 implements the processor assignments specified in the binary assignment matrix 260. At step 514, the isolation application 170 determines whether to continue executing. The isolation application 170 may determine whether to continue executing in any technically feasible fashion and based on any type of data. For instance, in some embodiments, the isolation application 170 may determine to cease executing based on an exit command received via an application programming interface ("API").

If, at step 514, the isolation application 170 determines to continue executing, then the method 500 returns to step 504, where the isolation application 170 receives a new container initiation event 162 or a new container termination event 164 from the container management subsystem 160. If, however, at step 514, the isolation application 170 determines not to continue executing, then the method 500 terminates.

In sum, the disclosed techniques may be used to efficiently execute workloads (e.g., tasks, processes, threads, containers, etc.) on processors implemented in NUMA architectures. In one embodiment, an isolation application executing on a NUMA microprocessor instance receives a container initiation event (specifying a requested processor count of logical processors) or a container termination event. In response, the isolation application updates a request vector that specifies the requested processor counts for all the containers currently executing or initiating execution on the NUMA microprocessor instance. An integer programming engine included in the isolation application then generates a binary assignment matrix that minimizes a cost function based on the request vector and the configuration of the NUMA microprocessor instance. The cost function estimates the performance impact of cache interference based on estimates of costs associated with single containers spanning multiple sockets, leaving one or more sockets without any assigned threads, two hyper-threads associated with a single container sharing L1 and L2 caches, two hyper-threads associated with different containers sharing L1 and L2 caches, and reassigning an executing thread to a different logical processor. The binary assignment matrix specifies a set of processor assignments that assigns each of the containers to the associated requested processor count of logical processors. Subsequently, a scheduler configuration engine configures the process scheduler for the NUMA microprocessor instance to assign thread(s) associated with each container to the logical processors as per the binary assignment matrix.

At least one technical advantage of the disclosed techniques relative to the prior art is that the isolation application can automatically and reliably reduce cache interference associated with co-located threads (i.e., threads sharing at least one cache) in a NUMA microprocessor instance. In particular, unlike prior art heuristic-approaches, the isolation application ensures that threads are assigned to logical processors in a data-driven fashion that can systematically reduce cache interference. Because reducing cache interference improves the latency and/or throughput of the logical processors, the time required for workloads to execute can be substantially decreased. Further, the variances in both latency and throughput are decreased, thereby increasing execution predictability and decreasing preemptive over-provisioning. These technical advantages represent one or more technological advancements over prior art approaches.

1. In some embodiments, a computer-implemented method comprises determining at least one processor assignment based on a performance cost estimate associated with an estimated level of cache interference arising from executing a plurality of workloads on a plurality of processors; and configuring at least one processor included in the plurality of processors to execute at least a portion of a first workload that is included in the plurality of workloads based on the at least one processor assignment.

2. The computer-implemented of clause 1, wherein the first workload comprises a container, an execution thread, or a task.

3. The computer-implemented method of clauses 1 or 2, wherein the plurality of processors are included in a non-uniform memory access multiprocessor instance.

4. The computer-implemented method of any of clauses 1-3, wherein configuring the at least one processor comprises transmitting at least one processor affinity command to a process scheduler.

5. The computer-implemented method of any of clauses 1-4, wherein determining the at least one processor assignment comprises executing one or more integer programming operations based on a first binary assignment matrix to generate a second binary assignment matrix that specifies the at least one processor assignment.

6. The computer-implemented method of any of clauses 1-5, wherein the plurality of processors are partitioned into at least a first subset of processors that are included in a first socket and a second subset of processors that are included in a second socket, and further comprising computing the performance cost estimate based on an estimated cross-socket memory access cost associated with executing a first execution thread associated with the first workload on a first processor included in the first subset of processors while executing a second execution thread associated with the first workload on a second processor included in the second subset of processors.

7. The computer-implemented method of any of clauses 1-6, wherein the plurality of processors are partitioned into at least a first subset of processors that are included in a first socket and a second subset of processors that are included in a second socket, and further comprising computing the performance cost estimate based on an estimated empty socket cost associated with executing the plurality of workloads on the first subset of processors.

8. The computer-implemented method of any of clauses 1-7, further comprising computing the performance cost estimate by estimating a cache sharing cost associated with sharing at least one of a level one cache and a level two cache between a first execution thread associated with the first workload and a second execution thread associated with a second workload included in the plurality of workloads.

9. The computer-implemented method of any of clauses 1-8, wherein a physical processor included in the plurality of processors includes a first logical processor and a second logical processor, and further comprising computing the performance cost estimate by estimating a cache sharing cost associated with executing a first execution thread associated with the first workload on the first logical processor and a second execution thread associated with the first workload on the second logical processor.

10 The computer-implemented method of any of clauses 1-9, further comprising computing the performance cost estimate by estimating a performance cost associated with executing a first thread associated with the first workload on a first processor included in the plurality of processors and subsequently executing a second thread associated with a second workload included in the plurality of workloads on the first processor.

11. In some embodiments, one or more non-transitory computer readable media include instructions that, when executed by one or more processors, cause the one or more processors to perform the steps of determining a first plurality of processor assignments based on a second plurality of processors assignments and a performance cost estimate associated with an estimated level of cache interference arising from executing a plurality of workloads on a plurality of processors; and configuring at least one processor included in the plurality of processors to execute at least a portion of a first workload that is included in the plurality of workloads based on at least one processor assignment included in the first plurality of processor assignments.

12. The one or more non-transitory computer readable media of clause 11, wherein the first workload comprises a container, an execution thread, or a task.

13. The one or more non-transitory computer readable media of clauses 11 or 12, wherein the plurality of processors are included in a non-uniform memory access multiprocessor instance.

14. The one or more non-transitory computer readable media of any of clauses 11-13, wherein determining the first plurality of processor assignments comprises performing one or more optimization operations on a first binary assignment matrix that specifies the second plurality of processor assignments to generate a second binary assignment matrix that specifies the first plurality of processor assignments.

15. The one or more non-transitory computer readable media of any of clauses 11-14, wherein the plurality of processors are partitioned into at least a first subset of processors that are included in a first socket and a second subset of processors that are included in a second socket, and further comprising computing the performance cost estimate based on an estimated cross-socket memory access cost associated with executing a first execution thread associated with the first workload on a first processor included in the first subset of processors while executing a second execution thread associated with the first workload on a second processor included in the second subset of processors.

16. The one or more non-transitory computer readable media of any of clauses 11-15, wherein the plurality of processors are partitioned into at least a first subset of processors that are included in a first socket and a second subset of processors that are included in a second socket, and further comprising computing the performance cost estimate based on an estimated empty socket cost associated with executing the plurality of workloads on the first subset of processors.

17. The one or more non-transitory computer readable media of any of clauses 11-16, wherein a physical processor included in the plurality of processors includes a first logical processor and a second logical processor, and further comprising computing the performance cost estimate by estimating a cache sharing cost associated with executing a first execution thread associated with the first workload on the first logical processor and a second execution thread associated with a second workload included in the plurality of workloads on the second logical processor.

18. The one or more non-transitory computer readable media of any of clauses 11-17, further comprising computing the performance cost estimate by estimating a cache sharing cost associated with sharing at least one of a level one cache and a level two cache between a first execution thread associated with the first workload and a second execution thread associated with the first workload.

19. The one or more non-transitory computer readable media of any of clauses 11-18, further comprising computing the performance cost estimate by estimating a performance cost associated with executing a first thread associated with the first workload on a first processor included in the plurality of processors and subsequently executing a second thread associated with a second workload included in the plurality of workloads on the first processor.

20. In some embodiments, a system comprises one or more memories storing instructions; and a plurality of processors that are coupled to the one or more memories and, when executing the instructions, are configured to perform one or more optimization operations on a plurality of processors assignments based on a performance cost estimate associated with an estimated level of cache interference arising from executing a plurality of workloads on the plurality of processors to generate a second plurality of processor assignments; and configure at least one processor included in the plurality of processors to execute at least a portion of a first workload that is included in the plurality of workloads based on at least one processor assignment included in the second plurality of processor assignments.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, the method comprising:
    determining a plurality of performance cost components associated with executing a plurality of workloads on a plurality of processors, wherein each performance cost component indicates a separate portion of an overall performance impact, wherein the overall performance impact is caused by cache interference that occurs when executing the plurality of workloads, and wherein each performance cost component is attributable to a corresponding factor associated with the cache interference;
    determining the overall performance impact caused by the cache interference based on the plurality of performance cost components;
    determining at least one processor workload assignment based on the overall performance impact; and
    causing at least one processor included in the plurality of processors to execute at least a portion of a first workload that is included in the plurality of workloads based on the at least one processor workload assignment.

2. The computer-implemented method of claim 1, wherein the first workload comprises a container, an execution thread, or a task.

3. The computer-implemented method of claim 1, wherein the plurality of processors are included in a non-uniform memory access multiprocessor instance.

4. The computer-implemented method of claim 1, wherein causing the at least one processor to execute at least the portion of the first workload comprises transmitting at least one processor affinity command to a process scheduler.

5. The computer-implemented method of claim 1, wherein determining the at least one processor workload assignment comprises executing one or more integer programming operations based on a first binary assignment matrix to generate a second binary assignment matrix that specifies the at least one processor workload assignment.

6. The computer-implemented method of claim 1, wherein the plurality of processors are partitioned into at least a first subset of processors that are included in a first socket and a second subset of processors that are included in a second socket, and determining the plurality of performance cost components includes estimating a cross-socket memory access cost associated with executing a first execution thread associated with the first workload on a first processor included in the first subset of processors while executing a second execution thread associated with the first workload on a second processor included in the second subset of processors.

7. The computer-implemented method of claim 1, wherein the plurality of processors are partitioned into at least a first subset of processors that are included in a first socket and a second subset of processors that are included in a second socket, and determining the plurality of performance cost components includes estimating an empty socket cost associated with executing the plurality of workloads on the first subset of processors.

8. The computer-implemented method of claim 1, wherein determining the plurality of performance cost components includes estimating a cache sharing cost associated with sharing at least one of a level one cache and a level two cache between a first execution thread associated with the first workload and a second execution thread associated with a second workload included in the plurality of workloads.

9. The computer-implemented method of claim 1, wherein a physical processor included in the plurality of processors includes a first logical processor and a second logical processor, and wherein determining the plurality of performance cost components includes estimating a cache sharing cost associated with executing a first execution thread associated with the first workload on the first logical processor and a second execution thread associated with the first workload on the second logical processor.

10. The computer-implemented method of claim 1, wherein determining the plurality of performance cost components includes estimating a performance cost associated with executing a first thread associated with the first workload on a first processor included in the plurality of processors and subsequently executing a second thread associated with a second workload included in the plurality of workloads on the first processor.

11. One or more non-transitory computer readable media including instructions that, when executed by one or more processors, cause the one or more processors to perform the steps of:
   determining a plurality of performance cost components associated with executing a plurality of workloads on a plurality of processors, wherein each performance cost component indicates a separate portion of an overall performance impact, wherein the overall performance impact is caused by cache interference that occurs when executing the plurality of workloads, and wherein each performance cost component is attributable to a corresponding factor associated with the cache interference;
   determining the overall performance impact caused by the cache interference based on the plurality of performance cost components;
   determining a first plurality of processor workload assignments based on a second plurality of processor workload assignments and the performance impact; and
   causing at least one processor included in the plurality of processors to execute at least a portion of a first workload that is included in the plurality of workloads based on at least one processor workload assignment included in the first plurality of processor workload assignments.

12. The one or more non-transitory computer readable media of claim 11, wherein the first workload comprises a container, an execution thread, or a task.

13. The one or more non-transitory computer readable media of claim 11, wherein the plurality of processors are included in a non-uniform memory access multiprocessor instance.

14. The one or more non-transitory computer readable media of claim 11, wherein determining the first plurality of processor workload assignments comprises performing one or more optimization operations on a first binary assignment matrix that specifies the second plurality of processor workload assignments to generate a second binary assignment matrix that specifies the first plurality of processor workload assignments.

15. The one or more non-transitory computer readable media of claim 11, wherein the plurality of processors are partitioned into at least a first subset of processors that are included in a first socket and a second subset of processors that are included in a second socket, and determining the plurality of performance cost components includes estimating a cross-socket memory access cost associated with executing a first execution thread associated with the first workload on a first processor included in the first subset of processors while executing a second execution thread associated with the first workload on a second processor included in the second subset of processors.

16. The one or more non-transitory computer readable media of claim 11, wherein the plurality of processors are partitioned into at least a first subset of processors that are included in a first socket and a second subset of processors that are included in a second socket, and determining the plurality of performance cost components includes estimating an empty socket cost associated with executing the plurality of workloads on the first subset of processors.

17. The one or more non-transitory computer readable media of claim 11, wherein a physical processor included in the plurality of processors includes a first logical processor and a second logical processor, and determining the plurality of performance cost components includes estimating a cache sharing cost associated with executing a first execution thread associated with the first workload on the first logical processor and a second execution thread associated with a second workload included in the plurality of workloads on the second logical processor.

18. The one or more non-transitory computer readable media of claim 11, wherein determining the plurality of performance cost components includes estimating a cache sharing cost associated with sharing at least one of a level one cache and a level two cache between a first execution thread associated with the first workload and a second execution thread associated with the first workload.

19. The one or more non-transitory computer readable media of claim 11, wherein determining the plurality of performance cost components includes estimating a performance cost associated with executing a first thread associated with the first workload on a first processor included in the plurality of processors and subsequently executing a second thread associated with a second workload included in the plurality of workloads on the first processor.

20. A system, comprising:
   one or more memories storing instructions; and
   a plurality of processors that are coupled to the one or more memories and, when executing the instructions, are configured to:
      determine a plurality of performance cost components associated with executing a plurality of workloads on a plurality of processors, wherein each performance cost component indicates a separate portion of an overall performance impact, wherein the overall performance impact is caused by cache interference that occurs when executing the plurality of workloads, and wherein each performance cost component is attributable to a corresponding factor associated with the cache interference;
      determine the overall performance impact that is caused by the cache interference based on the plurality of performance cost components;
      perform one or more optimization operations on a plurality of processor workload assignments based on the performance impact to generate a second plurality of processor workload assignments; and
      cause at least one processor included in the plurality of processors to execute at least a portion of a first workload that is included in the plurality of workloads based on at least one processor workload assignment included in the second plurality of processor workload assignments.

\* \* \* \* \*